United States Patent
Saulsbury et al.

(10) Patent No.: US 6,631,439 B2
(45) Date of Patent: Oct. 7, 2003

(54) VLIW COMPUTER PROCESSING ARCHITECTURE WITH ON-CHIP DYNAMIC RAM

(75) Inventors: Ashley Saulsbury, Los Gatos, CA (US); Nyles Nettleton, Campbell, CA (US); Michael Parkin, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/802,324

(22) Filed: Mar. 8, 2001

(65) Prior Publication Data

US 2002/0032831 A1 Mar. 14, 2002

Related U.S. Application Data

(60) Provisional application No. 60/187,796, filed on Mar. 8, 2000.

(51) Int. Cl.[7] .............................................. G06F 12/00
(52) U.S. Cl. ........................ 711/104; 711/101; 711/105; 711/170; 711/171; 711/172
(58) Field of Search .................................. 711/101, 104, 711/105, 1, 170–172

(56) References Cited

U.S. PATENT DOCUMENTS

| | | | |
|---|---|---|---|
| 4,725,945 A | 2/1988 | Kronstadt et al. | 711/106 |
| 4,894,770 A | 1/1990 | Ward et al. | 711/128 |
| 4,980,819 A | 12/1990 | Cushing et al. | |
| 5,184,320 A | 2/1993 | Dye | 365/49 |
| 5,261,066 A | 11/1993 | Jouppi et al. | 711/122 |

(List continued on next page.)

FOREIGN PATENT DOCUMENTS

WO    WO 00/33178    6/2000

OTHER PUBLICATIONS

Mitsubishi Electric Corp; Product Specification for Single–Chip CMOS Microcomputer; May 1998.*
Numomura Y et al: "M32R/D–Integrating DRAM and Microprocessor" IEEE Inc. New York, US, vol. 17 No. 6, Nov. 1, 1997, pp. 40–48, XP000726003; ISSN: 0272–1732.

(List continued on next page.)

*Primary Examiner*—T. V. Nguyen
(74) *Attorney, Agent, or Firm*—Townsend and Townsend and Crew LLP

(57) ABSTRACT

A novel processor chip (10) having a processing core (12), at least one bank of memory (14), an I/O link (26) configured to communicate with other like processor chips or compatible I/O devices, a memory controller (20) in electrical communication with processing core (12) and memory (14), and a distributed shared memory controller (22) in electrical communication with memory controller (20) and I/O link (26). Distributed shared memory controller (22) is configured to control the exchange of data between processor chip (10) and the other processor chips or I/O devices. In addition, memory controller (20) is configured to receive memory requests from processing core (12) and distributed shared memory controller (22) and process the memory request with memory (14). Processor chip (10) may further comprise an external memory interface (24) in electrical communication with memory controller (20). External memory interface (24) is configured to connect processor chip (10) with external memory, such as DRAM. Memory controller (20) is configured to receive memory requests from processing core (12) and distributed shared memory controller (22), determine whether the memory requests are directed to memory (14) on chip (10) or the external memory, and process the memory requests with memory (14) on processor chip (10) or with the external memory through external memory interface (24).

37 Claims, 5 Drawing Sheets

U.S. PATENT DOCUMENTS

| | | | |
|---|---|---|---|
| 5,301,340 A | 4/1994 | Cook | |
| 5,317,718 A | 5/1994 | Jouppi | 711/137 |
| 5,386,547 A | 1/1995 | Jouppi | 711/122 |
| 5,530,817 A | 6/1996 | Masubuchi | |
| 5,564,035 A | 10/1996 | Lai | 711/144 |
| 5,588,130 A | 12/1996 | Fujishima et al. | 711/118 |
| 5,623,627 A | 4/1997 | Witt | 711/122 |
| 5,649,154 A | 7/1997 | Kumar et al. | 711/122 |
| 5,650,955 A | 7/1997 | Puar et al. | 365/51 |
| 5,687,338 A | 11/1997 | Boggs et al. | 712/205 |
| 5,703,806 A | 12/1997 | Puar et al. | 365/181 |
| 5,900,011 A | 5/1999 | Saulsbury et al. | 711/119 |
| 5,953,738 A * | 9/1999 | Rao | 711/105 |
| 6,128,702 A | 10/2000 | Saulsbury et al. | 711/133 |
| 6,202,143 B1 * | 3/2001 | Rim | 710/107 |
| 6,256,256 B1 * | 7/2001 | Rao | 365/149 |
| 6,321,318 B1 * | 11/2001 | Baltz et al. | 711/154 |

OTHER PUBLICATIONS

Kozyrakis C E et al: "Scalable Processors in the Billion–Transistor Era: IRAM" Computer, IEEE Computer Society, Long Beach., CA, US, US vol. 20, No. 0 Sep. 1, 1997, pp. 75–78, XP000730003; ISSN: 0018–9162.

Herrmann Klaus, Hilgenstock Joerg, Pirsch Peter: "Architecture of a Multiprocessor System with Embedded DRAM for Large Area Integration" Oct. 8, 1997, IEEE International Conference on Innovative Systems in Silicon, Piscataway, NJ, USA; XP002179990.

Aimoto, Yoshiharu et al.; "A.768GIPS 3.84GB/s 1 W Parallel Image–Processing RAM Integrating a 16 Mb DRAM and 128 Processors"; ISSCC96/Session 23 / DRAM / Paper SP23.3; 1996 IEEE International Solid–State Circuits Conference; pp. 372–373 and 476.

Bursky, Dave; "Combo RISC CPU and DRAM Solves Data Bandwidth Issues"; Electronic Design; Mar. 4, 1996; pp. 67–71.

Saulsbury, Ashley, et al., "Missing the Memory Wall: The Case for Processor/Memory Integration"; ACM; 1996; pp. 90–101.

Shimizu, Toro, et al.; "A Multimedia 32b RISC Microprocessor with 16 Mb DRAM"; ISSCC96/Session 13 / Microprocessors/Paper FP 13.4; 1996 IEEE International Solid State Circuits Conference; pp. 216–217 and 448.

Mitsubishi Electric Corp; Product Specification for Single–Chip 32–Bit CMOS Microcomputer; © May 1998.

* cited by examiner

VLIW COMPUTER PROCESSING ARCHITECTURE WITH ON-CHIP DYNAMIC RAM

CROSS-REFERENCES TO RELATED APPLICATIONS

This applications claims the benefit of U.S. Provisional Patent Application Ser. No. 60/187,796, filed on Mar. 8, 2000 and entitled "VLIW Computer Processing Architecture with On-Chip Dynamic RAM," the entirety of which is incorporated by reference herein for all purposes.

BACKGROUND OF THE INVENTION

The present invention relates generally to a novel VLIW computer processing architecture, and more particularly to a processor having a scalable multi-pipeline processing core and memory fabricated on the same integrated circuit.

Computer architecture designers are constantly trying to increase the speed and efficiency of computer processors. However, conventional "state-of-the-art" CPU designs are predicated on the fact that there is a huge latency inherent in the accompanying memory systems, coupled with limited bandwidth communications between the memory systems and the CPU core. These inherent problems with current processor and memory latencies have led to computer architecture designs with many and large cache layers and highly complex designs—each additional fraction of design complexity obtaining only a small improvement in performance (i.e., diminishing returns).

For example, computer architecture designers have attempted to increase processing speeds by increasing clock speeds and attempting latency hiding techniques, such as data pre-fetching and cache memories. In addition, other techniques, such as instruction-level parallelism using very long instruction word (VLIW) designs, and embedded-DRAM have been attempted.

Combining memory (i.e., DRAM) and logic on the same chip appears to be an excellent way to improve internal memory bandwidth and reduce memory access latencies at a low cost. However, DRAM circuits tend to be sensitive to temperature and thermal gradients across the silicon die. Conventional RISC and CISC CPUs, because they must be clocked at high speeds to attain adequate performance, are necessarily energy inefficient and tend to produce a large amount of heat, which ultimately affects the performance of any DRAM residing on the same chip. Thus, architectures which attain their performance through instruction-level parallelism, instead of maximizing clock speeds, tend to be better suited for use with on-chip DRAM because they can exploit the large communication bandwidth between the processor and memory while operating at lower clock speeds and lower supply voltages. Examples of architectures utilizing instruction-level parallelism include single instruction multiple data (SIMD), vector or array processing, and very long instruction word (VLIW). Of these, VLIW appears to be the most suitable for general purpose computing.

Certain VLIW computer architecture designs are currently known in the art. However, while processing multiple instructions simultaneously may help increase processor performance, it is difficult to process a large number of instructions in parallel because of instruction dependencies on other instructions. In addition, most VLIW processors require extremely complex logic to implement the VLIW design, which also slows the performance of VLIW processors. In fact, with VLIW designs which do not take advantage of the memory efficiencies with on-chip DRAM, the average number of instructions per clock (IPC) can drop well below 1 when factors such as branch miss-prediction, cache misses, and instruction fetch restrictions are factored in. Thus, what is needed is a novel, high performance computer processing architecture to overcome the shortcomings of the prior art.

SUMMARY OF THE INVENTION

One embodiment of the present invention comprises a processor chip including a processing core, at least one bank of DRAM memory, an I/O link configured to communicate with other like processor chips or compatible I/O devices, and a communication and memory controller in electrical communication with the processing core, the at least one bank of DRAM memory, and the I/O link. The communication and memory controller is configured to control the exchange of date between the processor chip and the other processor chips or I/O device. The communication and memory controller also is configured to receive memory requests from the processing core, and the other processor chips via the I/O link, and process the memory requests with the at least one bank of DRAM memory.

In accordance with another embodiment of the present invention, the communication and memory controller comprises a memory controller in electrical communication with the processing core and the at least one bank of DRAM memory, and a distributed shared memory controller in electrical communication with the memory controller and the I/O link. The distributed shared memory controller is configured to control the exchange of data between the processor chip and the other processor chips or I/O devices. In addition, the memory controller is configured to receive memory requests from the processing core and the distributed shared memory controller, and process the memory requests with the at least one bank of DRAM memory.

In accordance with yet another embodiment of the present invention, the processor chip may further comprise an external memory interface in electrical communication with the communication and memory controller. In accordance with this aspect of the present invention, the external memory interface is configured to connect the processor chip in electrical communication with external memory. The communication and memory controller is configured to receive memory requests form the processing core and from the other processing chips via the I/O link, determine whether the memory requests are directed to the at least one bank of DRAM memory on the processor chip or the external memory, and process the memory requests with the at least one bank of DRAM memory on the processor chip of with the external memory through the external memory interface.

A more complete understanding of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

Introduction

The present invention provides a novel computer processor chip having a VLIW processing core and memory fabricated on the same integrated circuit, typically silicon. As one skilled in the art will appreciate, the VLIW processing core of the processor chip described herein may comprise any number of functional units within a pipeline for processing a plurality of VLIW sub-instructions. In addition, as will become apparent below, a plurality of processor chips may be combined in parallel to create multi-processor pipelines. Thus, the scalable computer processor chip and the scalable combination of chips can be used to develop a range of computer products from individual workstations, to network computers, to supercomputer systems.

System Overview

Figure 1:
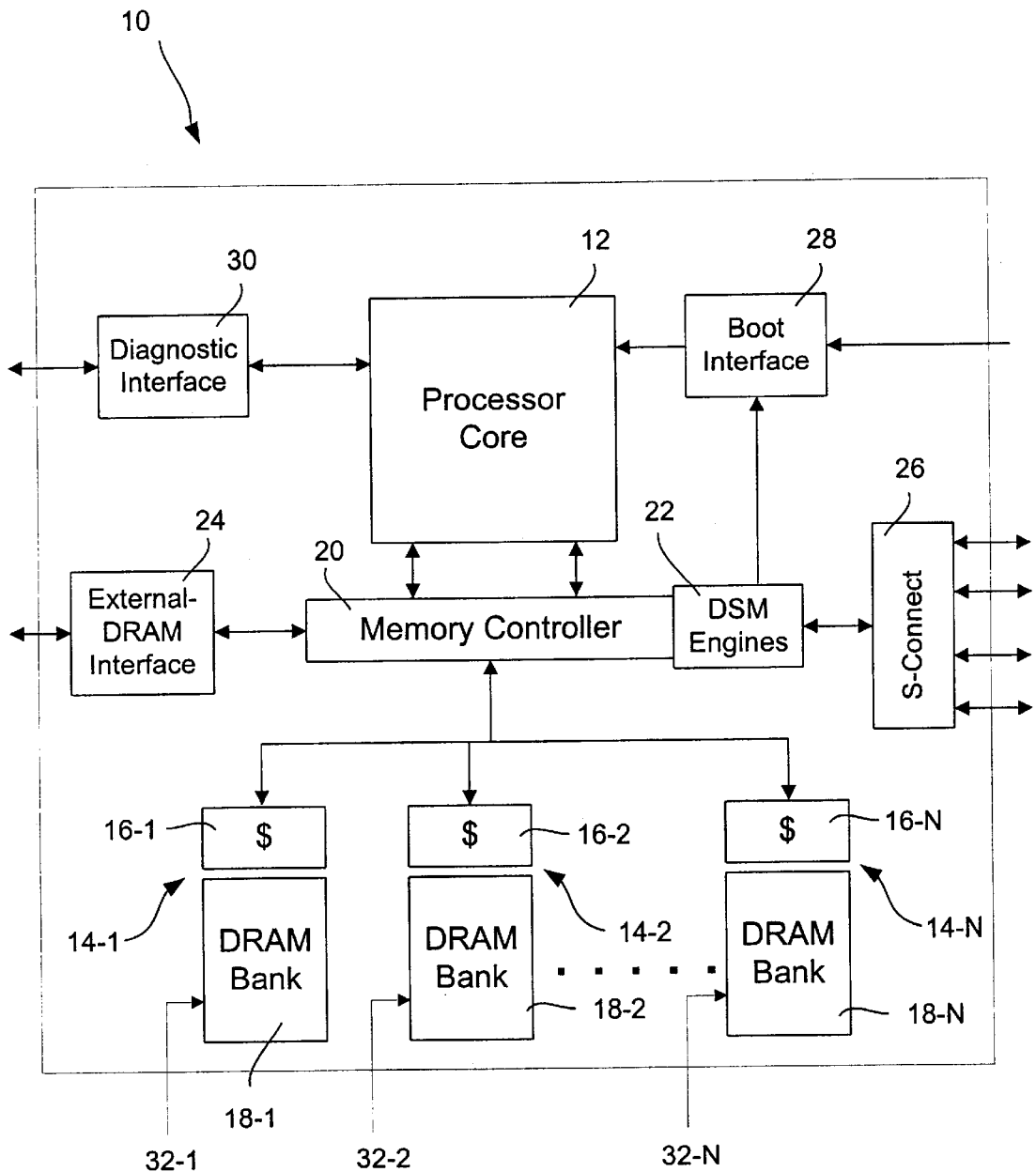
FIG. 1 is a block circuit diagram of a novel processor chip having the processor logic and memory on the same integrated circuit.

With reference to FIG. 1, one embodiment of a processor chip 10 in accordance with the present invention is shown. In particular, processor chip 10 comprises a processing core 12, a plurality of memory banks 14, a memory controller 20, a distributed shared memory controller 22, an external memory interface 24, a high-speed I/O link 26, a boot interface 28, and a diagnostic interface 30.

As discussed in more detail below, processing core 12 comprises a scalable VLIW processing core, which may be configured as a single processing pipeline or as multiple processing pipelines. The number of processing pipelines for a manufactured device typically is a function of the processing power preferred for the particular implementation. For example, a processor for a personal workstation typically will need fewer pipelines than are needed in a supercomputing system. In addition, while processor chip 10 is illustrated as having only one processor core 12, an alternative embodiment of the present invention may comprise a processor chip 10 being configured with multiple processor cores 12, each having one or more processing pipelines.

In addition to processing core 12, processor chip 10 comprises one or more banks of memory 14. As illustrated in FIG. 1, any number of banks of memory can be placed on processor chip 10. As one skilled in the art will appreciate, the amount of memory 14 configured on chip 10 is limited by current silicon processing technology. As transistor and line sizes decrease, the total amount of memory that can be placed on a processor chip 10 will increase.

Connected between processing core 12 and memory 14 is a memory controller 20. Memory controller 20 communicates with processing core 12 and memory 14, and as discussed in more detail below, handles the memory I/O requests to memory 14 from processing core 12 and from other processors and I/O devices. Connected to memory controller 20 is a distributed shared memory (DSM) controller 22, which controls and routes I/O requests and data messages from processing core 12 to off-chip devices, such as other processor chips and/or I/O peripheral devices. In addition, as discussed in more detail below, DSM controller 22 may be configured to receive I/O requests and data messages from off-chip devices, and route the requests and messages to memory controller 20 for access to memory 14 or processing core 12. In addition, while FIG. 1 shows memory controller 20 and DSM controller 22 as two separate units, one skilled in the art will appreciate that memory controller 20 and DSM controller 22 can be configured as one unit. That is, one controller can be configured to process the control functions of both memory controller 20 and DSM controller 22. Thus, the present invention is not limited to the illustrated embodiment.

High-speed I/O link 26 is connected to DSM controller 22. In accordance with this aspect of the present invention, DSM controller 22 communicates with other processor chips and I/O peripheral devices across I/O link 26. For example, DSM controller 22 sends I/O requests and data messages to other devices via I/O link 26. Similarly, DSM controller 22 receives I/O requests from other devices via the link.

Processor chip 10 further comprises an external memory interface 24. As discussed in greater detail below, external memory interface 24 is connected to memory controller 20 and is configured to communicate memory I/O requests from memory controller 20 to external memory. Finally, as mentioned briefly above, processor chip 10 further comprises a boot interface 28 and a diagnostic interface 30. Boot interface 28 is connected to processing core 12 and is configured to receive a bootstrap program for cold booting processing core 12 when needed. Similarly, diagnostic interface 30 also is connected to processing core 12 and configured to provide external access to the processing core for diagnostic purposes.

Processing Core

1. General Configuration

As mentioned briefly above, processing core 12 comprises a scalable VLIW processing core, which may be configured as a single processing pipeline or as multiple processing pipelines. In addition, each processing pipeline may comprise one or more processing paths for processing instructions. Thus, a single processing pipeline can function as a single pipeline with a single processing path for processing one instruction at a time, as a single pipeline having multiple processing paths for processing multiple instructions independently, or as a single VLIW pipeline having multiple processing paths for processing multiple sub-instructions in a single VLIW instruction word. Similarly, a multi-pipeline processing core can function as multiple autonomous processing cores of as one or more synchronized VLIW processing cores. This enables an operating system to dynamically choose between a synchronized VLIW operation or a parallel multi-thread or multi-strand paradigm. In accordance with one embodiment of the invention, processing core 12 may comprise any number of pipelines and each of the pipelines may comprise any number of processing paths. For example, the processing core may comprise X-number of pipelines, each having Y-number of processing paths, such that the total number of processing paths is X*Y.

In accordance with one embodiment of the present invention, when processing core 12 is operating in the synchronized VLIW operation mode, an application program compiler typically creates a VLIW instruction word comprising a plurality of sub-instructions appended together, which are then processed in parallel by processing core 12. The number of sub-instructions in the VLIW instruction word matches the total number of available processing paths in the one or more processing core pipelines. Thus, each processing path processes VLIW sub-instructions so that all the sub-instructions are processed in parallel. In accordance with this particular aspect of the present invention, the sub-instructions in a VLIW instruction word issue together. Thus, if one of the processing paths is stalled, all the sub-instructions will stall until all of the processing paths clear. Then, all the sub-instructions in the VLIW instruction word will issue at the same time. As one skilled in the art will appreciate, even though the sub-instructions issue simultaneously, the processing of each sub-instruction may complete at different times or clock cycles, because different instruction types may have different processing latencies.

In accordance with an alternative embodiment of the present invention, when the multi-pathed/multi-pipelined processing core is operating in the parallel multi-thread/multi-strand mode, the program instructions are not necessarily tied together in a VLIW instruction word. Thus, as instructions are retrieved from an instruction cache, the operating system determines which pipeline is to process a particular instruction stream. Thus, with this particular configuration, each pipeline can act as an independent processor, processing instructions independent of instructions in the other pipelines. In addition, in accordance with one embodiment of the present invention, by using the multi-threaded mode, the same program instructions can be processed simultaneously by two separate pipelines using two separate blocks of data, thus achieving a fault tolerant processing core. The remainder of the discussion herein will be directed to a synchronized VLIW operation mode. However, the present invention is not limited to this particular configuration.

2. Very Long Instruction Word (VLIW)

Figure 2:
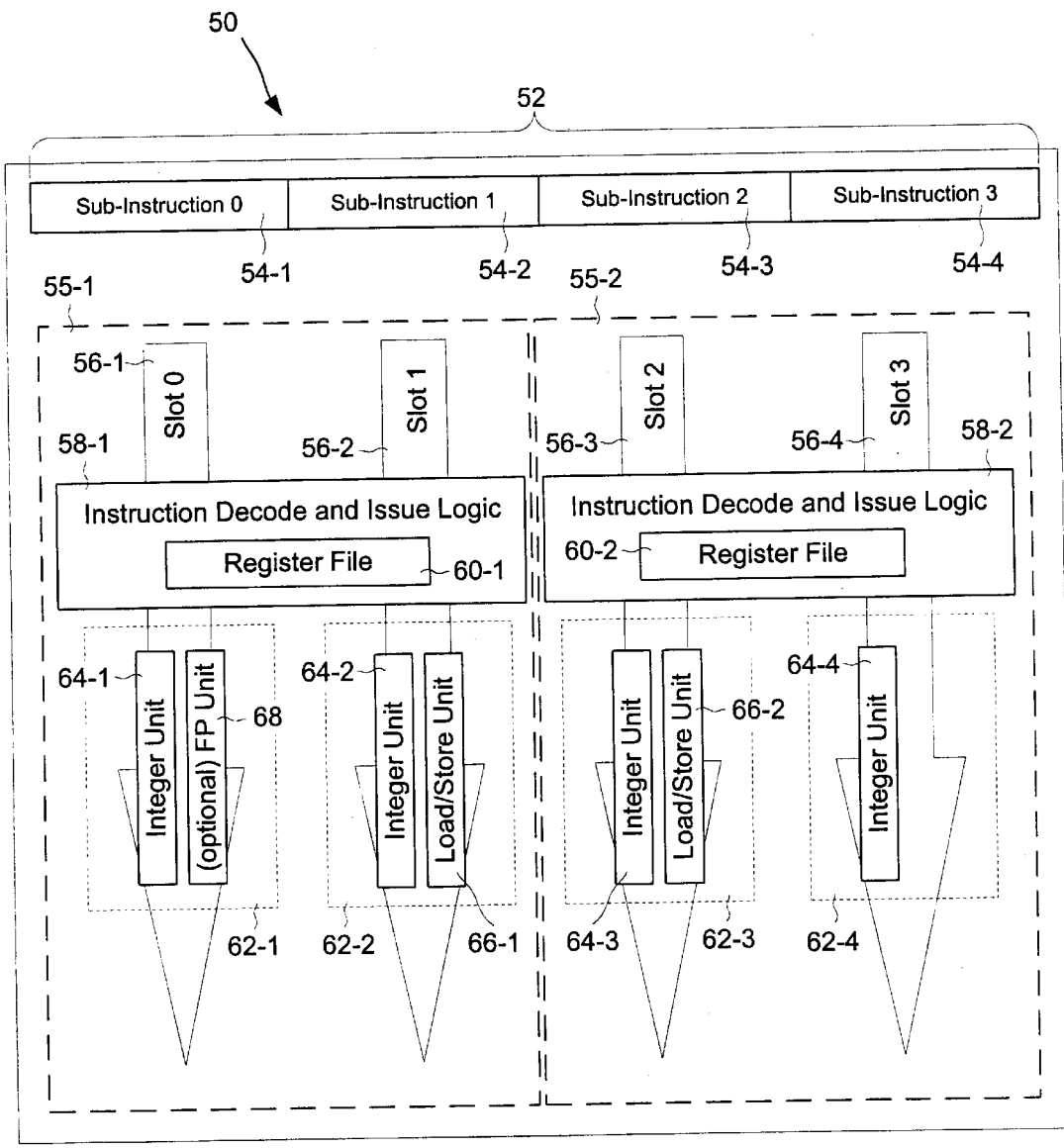
FIG. 2 is block diagram showing a processing core having a 4 functional unit VLIW pipeline design.

Referring now to FIG. 2, a simple block diagram of a VLIW processing core 50 is shown. In accordance with the illustrated embodiment, processing core 50 comprises two pipelines, 55-1 and 55-2, and four processing paths, 56-1 to 56-4, two per pipeline. In addition, a VLIW 52 comprises four RISC-like sub-instructions, 54-1, 54-2, 54-3, and 54-4, appended together into a single instruction word. The number of VLIW sub-instructions 54 correspond to the number of processing paths 56 in processing core 50. Accordingly, while the illustrated embodiment shows four sub-instructions 54 and four processing paths 56, one skilled in the art will appreciate that processing core 50 may comprise any number of sub-instructions 54 and processing paths 56. Indeed, as discussed above, processing core 50 may comprise X-number of pipelines each having Y-number of processing paths, such that the total number of processing paths is X*Y. Typically, however, the number of sub-instructions 54 and processing paths 56 is a power of 2.

Each sub-instruction 54 corresponds directly with a specific processing path 56 within processing core 50. Each of the sub-instructions 54 are of similar format and operate on one or more related register files 60. For example, processing core 50 may be configured so that all four processing paths 56 access the same register file, or processing core 50 may be configured to have multiple register files 60. For example, each pipeline 55 may have one or more register files, depending on the number of processing paths 56 in each pipeline 55. In accordance with the illustrated embodiment of the present invention, pipeline 55-1 comprises one register file 60-1, while pipeline 55-2 comprises a second register file 60-2. As discussed in more detail below, such a configuration can help improve performance of the processing core.

As illustrated in FIG. 2, and as discussed in more detail below with reference to FIG. 4, one or more instruction decode and issue logic stages 58 in pipelines 55 receive VLIW instruction word 52 and decode and issue the sub-instructions 54 to the appropriate processing paths 56. Each of the sub-instructions 54 then pass to the execute stages of pipelines 55, which include a functional or execute unit 62 for each processing path 56. Each functional or execute unit 62 may comprise an integer processing unit 64, a load/store processing unit 66, a floating point processing unit 68, or a combination of any or all of the above. For example, in accordance with the particular embodiment illustrated in FIG. 2, execute unit 62-1 includes integer processing unit 64-1 and floating point processing unit 68; execute unit 62-2 includes integer processing unit 64-2 and load/store processing unit 66-1; execute unit 62-3 includes integer processing unit 64-3 and load/store unit 66-2; and execute unit 62-4 includes only integer unit 64-4.

As one skilled in the art will appreciate, scheduling of sub-instructions within a VLIW instruction word and scheduling the order of VLIW instruction words within a program is important so as to avoid unnecessary latency problems, such as load, store and write-back dependencies, which can cause pipeline stalls. In accordance with one embodiment of the present invention, the scheduling responsibilities are primarily relegated to the compilers for the application programs. Thus, unnecessarily complex scheduling logic is removed from the processing core, so that the design implementation of the processing core is made as simple are possible. Advances in compiler technology thus result in improved performance without redesign of the hardware. In addition, some particular processing core implementations may prefer or require certain types of instructions to be executed only in specific pipeline slots or paths to reduce the overall complexity of a given device. For example, in accordance with the embodiment illustrated in FIG. 2, since only processing path 56-1, and in particular execute unit 62-1, include a floating point processing unit 68, all floating point sub-instructions are dispatched through path 56-1 in pipeline 55-1. As discussed above, the compiler is responsible for handling such issue restrictions.

In accordance with one embodiment of the present invention, all of the sub-instructions 54 within a VLIW instruction word 52 issue in parallel. Should one of the sub-instructions 54 stall (i.e., not issue), for example due to an unavailable resource, the entire VLIW instruction word 52 stalls until the particular stalled sub-instruction 54 issues. By ensuring that all sub-instructions within a VLIW instruction word issue simultaneously, the hardware implementation logic is dramatically simplified.

3. Processing Core Pipeline

Figure 3:
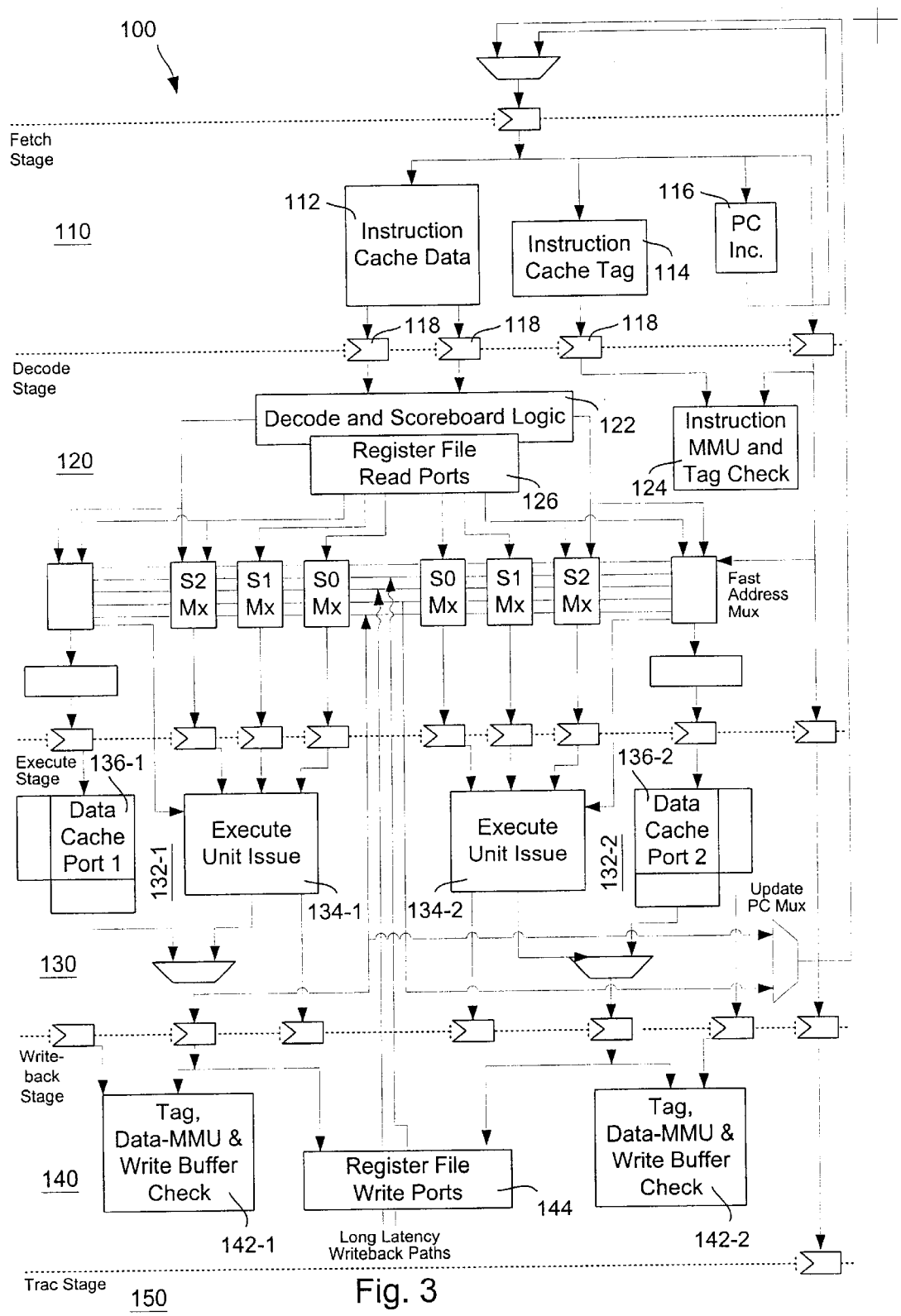
FIG. 3 is a detailed layout of a processing core having a 2 functional unit VLIW pipeline design.

Referring now to FIG. 3, for further understanding of the invention a two sub-instruction VLIW pipeline 100 is illustrated in more detail in conjunction with a typical five-stage pipeline. In particular, pipeline 100 comprises a fetch stage 110, a decode stage 120, an execute stage 130, a write-back stage 140, and a trap stage 150.

A. Fetch Stage

Fetch stage 110 performs a single cycle access to an instruction cache 112 and an instruction tag cache 114 based on the lowest N bits of the current program counter (PC) to obtain a VLIW instruction word. In accordance with one embodiment of the present invention, instruction cache 112 comprises a plurality of 64-bit wide cache memory locations. Each instruction cache memory location may hold two 32-bit sub-instructions. As illustrated in FIG. 3, since processing pipeline 100 is a two sub-instruction pipeline, one 64-bit VLIW instruction comprising two 32-bit sub-instructions from instruction cache 112 will feed both pipelines. However, as one skilled in the art will appreciate, if the processing core pipeline comprises four or more processing paths, multiple 64-bit instructions will be retrieved from instruction cache 112 to feed all the VLIW paths. For example, for a four-path pipeline implementation, two 64-bit instruction words each containing two 32-bit sub-instructions are needed to feed the four-path pipeline.

After the instructions and instruction tags are fetched from instruction cache 112 and instruction tag cache 114, respectively, the fetched instructions and instruction tags are passed to decode stage 120. Actually, in accordance with one embodiment of the invention, the fetched instructions and tags first are passed to one or more physical registers 118, which hold the instructions and tags for a single clock period. The instructions and tags then are passed to decode stage 120, and in particular decode and scoreboard logic unit 122, from registers 118 on the next clock cycle.

B. Decode Stage

In decode stage 120, the instruction tags are checked by tag check unit 124 to ensure that the instruction cache tag matches the program counter (PC) before allowing the instruction to pass onto execute stage 130. In accordance with this aspect of the present invention, if the cache tags do not match the PC, the VLIW instruction word stalls and the processor starts a suitable instruction cache miss procedure. For example, the processor may flush the instructions from the pipeline and then go to main memory to retrieve the appropriate instruction(s).

In accordance with one embodiment of the present invention, the instruction words are pre-decoded before being placed in instruction cache 112. The compiler determines which sub-instructions are to be grouped into a VLIW instruction word, as well as the particular location of each sub-instruction within the VLIW instruction word. The compiler also determines the order in which the VLIW instruction words are to be processed. In this manner, the compiler effectively resolves which processing path within the processing core pipeline each sub-instruction is destined for. Thus, decode stage 120 does not need to align the sub-instructions with the processing paths in the pipeline, because the compiler is responsible for that scheduling task. In addition to the compiler, the logic which loads the instructions from memory into instruction cache 112 also can perform some pre-decoding functions. For example, the load logic can analyze instructions and add additional bits to each instruction, indicating to the processor the kind or type of instruction it is (e.g., load, store, add, etc.).

While some of the decode functions are performed prior to the decode stage 120, decode stage 120 does read each register in register file 60 that is to be accessed or used in execute stage 130 by each sub-instructions in the VLIW instruction word. In accordance with this aspect of the present invention, decode stage 120 uses register file read port unit 126 to read the appropriate registers, and then checks the availability of the those registers (i.e. checks the scoreboard for each register). If one or more of the registers are in use or unavailable, decode stage 120 holds the entire VLIW instruction word until the registers become available.

If the instruction cache tag and register scoreboarding checks are valid, decode stage 120 checks to see if the execute units in execute stage 130 are available (i.e., not currently processing or stalled). If all execute units are available, the VLIW instruction word passes to execute stage 130 via registers 118. That is, the VLIW instruction word passes to registers 118, in one clock period, and then onto execute stage 130 on the next clock period.

C. Execute Stage

In accordance with the illustrated embodiment, execute stage 130 of pipeline comprises two execute paths 132-1 and 132-2. Execute paths 132-1, 132-2 include execute units 134-1 and 134-2, respectively, each having a number of functional processing units (not shown). Execute stage 130 is the entry point for each of the functional processing units within execute units 134. At this point, each of the sub-instructions operate independently, but execute stage paths 132 operate under the same clock, so they remain synchronized within the pipeline.

Decode stage 120 issues each sub-instruction to one of the functional units within execute units 134, depending on the sub-instruction type. The basic functional units include an arithmetic/logic unit (ALU), a load/store unit, and a floating point unit. The ALU performs shifts, adds, and logic operations, as well as address computations for loads and stores. The load/store units typically transfer data between memory (i.e., data cache 136 or other cache or physical memory) and the processing core's register file. The floating point units processes floating point transactions in accordance with the IEEE-754-1985 floating point standard. The general operation of ALU, load/store and floating point functional units are well known in the art, and therefore will not be discussed further herein.

D. Write-Back Stage

In Write-back stage 140, results from execute stage 130 are written into the appropriate destination register in register file 60. For example, in the case of a load instruction, execute stage 130 retrieves data from memory, and in particular data cache 136. In addition, a data cache tag associated with the data also is retrieved. In write-back stage 140 a data cache tag check unit 142 checks the data cache tag to ensure that the retrieved data is the proper data. If it is, the data is written to register file 60 using register file write ports 144. If, on the other hand, the first level data cache 136 is missed (i.e., the data cache tag check was not valid), then the load instruction is entered into a load buffer to await execution, and a scoreboard entry is set for the particular register which was to be loaded. That is, the register that was to be loaded by the load instruction is not unavailable until the load instruction completes. When the data cache 136 is accessible, the retrieved data from cache 136 is then written to the appropriate register and processing continues.

E. Trap Stage

Trap stage 150 is configured to handle various processing "traps", such as load misses, branch errors, and other architectural traps like "divide by zero". For example, when a load miss occurs, trap stage 150 sets the scoreboard for the register, which was to receive the data from the load instruction. Then, the pipeline is checked to determine if subsequent instructions in the pipeline are dependent upon the register, which has the scoreboard set for it. If there is a dependent instruction in the pipeline, all instructions that are behind the load miss instruction in the pipeline are flushed out of the pipeline. Then, the dependent instruction(s) are reloaded into the pipeline and continue processing when the delayed load instruction completes. As one skilled in the art will appreciate, other trap situations may require different trap processing. However, since trap processing is well known in the art, it will not be discussed further herein.

4. Register File

Figure 4:
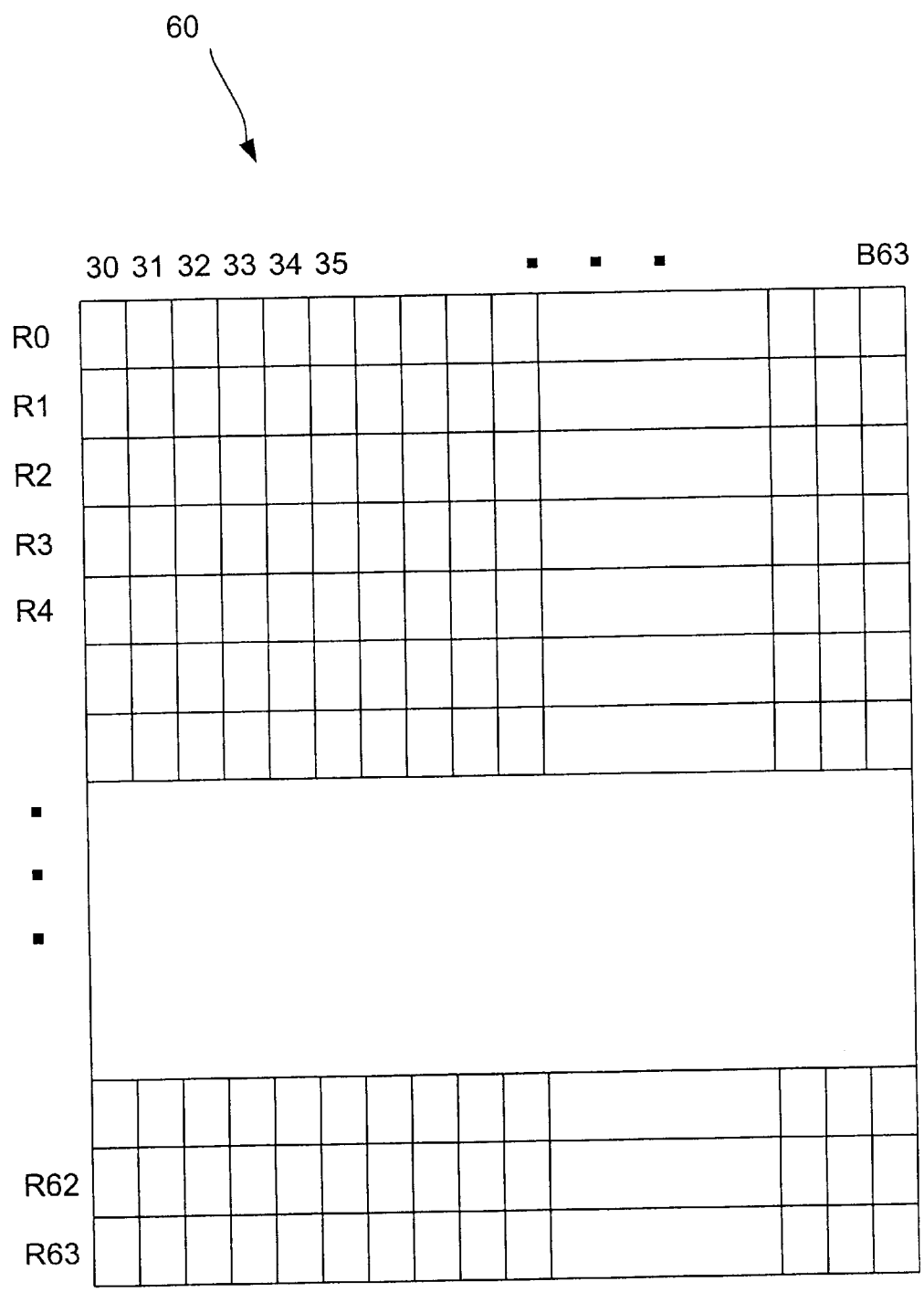
FIG. 4 is a block diagram of an exemplary register file used by a processing core of the present invention.

Referring now to FIG. 4, a configuration of a register file 60 is shown. In accordance with one embodiment of the present invention, register file 60 comprises 64 registers (R0–R63), each being 64-bits wide (B0–B63). In the prior art processor designs, the integer and floating point functional units typically have separate register files. In accordance with one embodiment of the present invention, however, the integer, load/store, and floating point functional units all share the same register file. By having all the functional units sharing the same register file, memory system design is simplified and instruction set complexity is reduced. For example, because the integer and floating point units share the same register file, communication between the integer and floating point units does not occur via memory, like conventional RISC processor architectures, but may occur through the register file. Thus, only a single set of load and store operations need to be implemented for both integer and floating point instructions. In addition, because both integer and floating point operations share the same register file, certain floating point operations can be partially implemented using circuitry in the integer unit.

In accordance with another embodiment of the present invention, one of the 64 general purpose registers is hard-wired to zero, and a second predetermined register is reserved for the program counter. By having one register set to zero and another register for holding the program counter, register file 60 always holds a known value. Thus, instead of calculating memory location values from scratch, the locations can be calculated as an offset from the program counter, speeding up the address calculation process. For example, to calculate a 64-bit address and use it to load a value, a prior art SPARC processor typically requires 6 instructions:

| | | |
|---|---|---|
| sethi | %uhi(address), %l1 | (take bits 42–63 from the value "address" and place in bits 10–31 of local register l1; set bits 0–9 and 32–63 of local register l1 to zero) |
| or | %l1, %ulo(address), %l1 | (or bits 32–41 from the value "address" with local register l1, so that bits 32–41 are placed in bits 0–9 of local register l1) |
| sl1x | %l1, 32, %l1 | (shift lower bits 0–31 of local register l1 to upper bits 32–63 of local register l1) |
| sethi | %hi(address), %g1 | (take bits 10–31 from the value "address" and place in bit 10–31 of global register g1; set bits 0–9 and 32–63 of global register g1 to zero) |
| or | %l1, %g1, %l1 | (or bits 0–9 from the value "address" with global register g1, so that bits 0–9 from "address" are placed in bits 0–9 of global register g1) |
| add | [%l1+%g1], %l0 | (loads the value from the address calculated by adding local register l1 with global register g1 into local register l0) |

On the other hand, by calculating a 64-bit address using the program counter, the number of instructions can be greatly reduced. For example, the following is a list of instructions which will calculate a 64-bit address using the program counter:

| | | |
|---|---|---|
| add R0, 1, Rx | | (Add 1 to the value in R, (which is zero) and place the result in register Rx. The affect is that Rx holds the value 1.) |
| sl1 Rx, 20, Rx | | (Logical left shift of the value in register Rx by 20 bits and place the results in register Rx. The affect is to change the value in register Rx, from 20 or 1 to 220 or 1,048,576.) |
| ld [Rpc + Rx], R | | (Load the value stored in memory at address [Rpc + Rx] into register R. The affect is to load register R with a value of a memory location which is offset from the program counter by 220 or 1MB.) |

As illustrated by the listed instructions, by using the program counter to calculate a memory address, the number of instructions is cut approximately in half.

In addition to being used to calculate memory addresses, the program counter can be used to help reduce the size of jump tables. Specifically, instead of a jump table holding large address values for the jump destinations, the jump table can merely hold an offset value from the program counter. In this manner, much smaller values can be held in the jump table.

Finally, by having the program counter stored in a dedicated register in the register file, add operation can perform jumps and links. For example, if an offset value is added to the program counter and that value is stored back in the program counter register, the program automatically will jump to the location in the program equal to the value of the program counter plus the offset value. Therefore, for example, the following command will perform a jump operation:

| | |
|---|---|
| add Rpc, 128, Rpc | (The program counter is incremented by 128, so the program will jump to an instruction 128 locations further in the program.) |

Finally, unlike the prior art RISC processor architectures, the register file of the present invention does not include condition code registers. Condition code registers can be a code bottleneck, requiring a separate scheduling algorithm in a compiler. In addition, single instruction multiple data (SIMD) instructions either cannot work with condition codes, or require multiple condition code sets per instruction, which also increases the architecture complexity and slows processing. Thus, instead of condition code registers, the present invention uses general purpose registers to store the results of compare instructions, which are then used for conditional operations.

As one skilled in the art will appreciate, increasing the number of sub-instructions and processing pipelines and paths within a VLIW processing core places strains on the architecture. For example, as the number of parallel instruction streams increase, so does the pressure on the register file, and in particular on the number of available registers. Thus, beyond a small number of sub-instructions (e.g., two), a single register file becomes impractical to implement due to the number of read and write ports required. To circumvent these problems, the present invention provides for multiple register files for multiple pipeline paths.

In particular, as mentioned briefly above, processing pipeline may utilize a single register file, or a few processing paths within a pipeline may share one of a plurality of register files. In accordance with one embodiment of the present invention, the processing core is configured so that every two VLIW sub-instructions and processing paths use one register file. Thus, as illustrated in FIG. 2, to support a four sub-instruction VLIW core (2 pipelines each having 2 processing paths), two register files are used—each supporting a pair of sub-instructions. For example, as illustrated in FIG. 2, processing paths 54-1 and 54-2 in pipeline 55-1 share a first register file 60-1 and processing paths 54-3 and 54-4 in pipeline 55-2 share a second register file 60-2. Moreover, as the number of processing paths within a pipeline increase the number of register files also increase; i.e., the number of register files is scalable with the number of processing pipelines and processing paths within the pipelines.

In addition, in accordance with one embodiment of the present invention, registers within each register file store either private or global data values. In accordance with this aspect of the present invention, if the execution of a sub-instruction writes to a global register in a register file, the value written may be propagated to the same register in the other register files, using, for example, bus or trickle propagation techniques. In accordance with bus propagation techniques, once a value is written to a global register in one of the register files, that value is broadcast to the other register files via a bus, and then written in those register files. Bus propagation is an effective means of communicating writes between the various register files, but bus propagation can limit scalability of the processor because it typically requires each device on the bus to have read ports for all other devices on the bus. Thus, it is difficult to add additional processors without affecting the processors already in the system.

With trickle propagation, each processor, pipeline or group of pipelines using a register file passes a global write command to the pipelines or processor next to it. In accordance with this aspect of the invention, global writes pass from one set of pipelines or processors to the next, "trickling" the write to all the register files in the system.

If a register is tagged as a private register, the value in that register typically will differ from the values in the registers having the same register number in the other register files. This configuration allows certain data values/registers to be shared among the different pipelines, while keeping some data values/registers private to each particular pipeline or pair of pipelines.

One method of tagging registers in a register file as either global or private is to use a special register to indicate the status of the registers in the file. In accordance with this aspect of the invention, a 64-bit register is used. Each bit in the special register indicates whether a corresponding register in the 64-bit register file is global or private. For example, bit 0 of the special register may correspond to register 0 of the register file and so on. If the bit is set to 0, the register is global, and if the bit is set to 1, the register is private. Similarly, a 0-bit may indicate a private register while a 1-bit may indicate a global register. The particular notation is not important.

By implementing two register files as illustrated in FIG. 2, the code stream can dynamically use between 64 and 128 registers. As the processing core of the architecture is scaled, and the number of register files implemented increases, the number of registers available for code use also increases. Thus, the use of multiple register files provides architectural scalability without the need for complex multi-port register files. Such a configuration scales the number of available registers with the number of processing pipelines or paths, and thus eliminates many register congestion problems.

Memory

Referring again to FIG. 1, memory 14, typically DRAM, now will be described in more detail. In particular, as mentioned above, memory 14 may be fabricated on the same silicon die as processing core 12. With this particular configuration, data can be transferred between processing core 12 and memory 14 at a much faster rate than between a processor and off-chip memory for several reasons. First, because the processor and memory are on the same chip, the latency caused by distance is greatly reduced. The distance between the processor and the memory is much smaller. Second, as one skilled in the art will appreciate, a communication interface fabricated on a chip can have a much larger communication bandwidth than a communication interface between separate integrated circuit (IC) devices communicating through pins on the separate IC chips. For example, in accordance with one embodiment of the present invention, the communication speed between processing core 12 and memory 14 may be in the range of between about 500 megabytes/sec. and about 20 gigabytes/sec., and more preferably about 2–4 gigabytes/sec. Because of the increased access speed between processing core 12 and memory 14, the memory access latencies are dramatically reduced.

The communication speeds disclosed herein relate to one embodiment of the present invention. As one skilled in the art will appreciate, as silicon processing techniques are improved, the communication speeds and bandwidths between processing core 12 and memory 14 also will increase. Thus, the present invention is not limited to the particular speeds disclosed herein.

In accordance with one embodiment of the present invention, memory 14 comprises DRAM memory and can be configured as either cache memory with associated tags or as directly accessible physical memory. Alternatively, memory 14 can be a combination of both cache and physical memory.

In accordance with another embodiment of the present invention, memory 14 includes a control input bit 32 (FIG. 1) which controls the mode of memory 14. For example, when control bit 32 is in one state, memory 14 operates as cache memory, and when control bit 32 is in another state, memory 14 operates as physical memory. In the embodiment illustrated in FIG. 1, each memory bank 14 includes its own control bit 32. However, in an alternative embodiment of the present invention, one control bit 32 may be configured to control the operation of all memory banks 14.

Memory Controller

Memory controller 20 (FIG. 1) is configured to receive memory I/O and synchronization requests from processing core 12 and DSM controller 22, and pass the requests to the on-chip memory 14 or to external memory through external memory interface 24. Memory controller 24 ensures that memory access requests from processing core 12 to on-chip memory 14 or to external memory are consistent with the state of the memory being accessed. In the case of a memory inconsistency, DSM controller 22 may be invoked to resolve the inconsistency. In accordance with this aspect of the invention, DSM controller 22 either changes the state of the memory being accessed, or causes an exception for processing core 12.

In accordance with another embodiment of the present invention, memory controller 20 may be configured to handle certain implementation dependent load and store operations with on-chip memory 14, external memory, or memory residing on the other processor chips. For example, memory controller 20 may be configured to control endianness, caching and prefetching operations for certain program or operating systems implementations.

DSM Controller

As mentioned above, distributed shared memory (DSM) controller 22 (FIG. 1) is configured to correct inconsistencies in memory states once the inconsistencies are detected by memory controller 20. In addition, DSM controller 22 handles the exchange of data between processing core 12 and other off-chip processors and their associated memories, or I/O devices via I/O link 26. Any number of a variety of communication protocols may be used to handle the communications with the other I/O devices or off-chip processors. As discussed in more detail below, such a configuration creates a shared memory and processor environment.

In the cases where DSM controller 22 handles memory inconsistencies, DSM controller 22 typically generates exceptions to processing core 12, so that an operating system exception handler can implement a software cache coherence protocol. However, in accordance with an alternative embodiment of the present invention, DSM controller 22 may include a plurality of independent programmable protocol engines for implementing a range of cache coherence protocols provided by an operating system.

In the case of data exchange or sharing with off-chip devices, DSM controller 22 is configured with two communication engines; one engine for handling local communication and I/O requests, and the second engine for handling remote communication and I/O requests. For example, the first engine receives I/O requests and data messages from processing core 12 destined for off-chip devices, and passes the requests to the proper off-chip location. On the other hand, the second communication engine receives I/O request from remote devices and processes the requests with processing core 12, memory 14, or any external memory associated with the particular processor chip.

While one embodiment of DSM controller 22 is disclosed herein as having two communication engines (e.g., local and remote), one skilled in the art will appreciate that other configurations for DSM controller 22 may be used. For example, DSM controller 22 may be configured with only one communication engine, or alternatively, several engines may be used. In addition, DSM controller 22 may be configured with a plurality of routing tables or routing instructions for controlling message and I/O routing, and DSM controller 22 may be programmed to handle autorouting functions. Finally, even though memory controller 20 and DSM controller 22 are illustrated in FIG. 1 and described herein as separate devices, one skilled in the art will appreciate that memory controller 20 and DSM controller 22 can be configured as a single device which handles the functions of both devices. Thus, the configurations and operations of memory controller 20 and DSM controller 22 are not limited to the disclosure herein.

I/O Link

I/O link 26 comprises a high-speed, packet-switched I/O interface for connecting processor chip 10 to other processor chips or I/O devices. As discussed briefly above, I/O link 26 interfaces with processing core 12 through DSM controller 22, which controls the communication of I/O requests and data messages between processing core 12 and other processor chips or I/O devices.

I/O link 26 comprises a plurality of I/O ports, which may be configured as either serial or parallel communication ports. In particular, in accordance with one embodiment of the present invention, the number of ports is scalable so that the number of other processor chips and I/O devices, which may be directly connected to processor chip 10, may be increased as necessary. In accordance with one aspect of the present invention, I/O link 26 comprises a single packet switch handling a plurality of I/O ports, so the bandwidth of I/O link 26 scales as a function of the total number of ports in I/O link 26. In addition, I/O link 26 may be compatible with a number of I/O bus interfaces, such as PCI, fibre channel, firewire, universal serial bus, and the like. DSM controller 22 is configured to handle the compatibility and communications with the I/O bus interfaces. Finally, I/O link 26 may be configured to handle hotplugging of devices to processor chip 10, as well as dynamic routing and priority routing of I/O requests to and from off-chip devices.

External Memory Interface

External memory interface 24 (FIG. 1) comprises a read/write interface to external memory. The external memory can be any desired type, e.g. volatile, non-volatile, etc. External memory interface 24 is an expansion port on processor chip 10, which allows memory in addition to the on-chip memory to be connected to the chip. As discussed above, access and use of the external memory via external memory interface 24 is dictated by memory controller 20 and DSM controller 22. That is, memory controller 20 directs the memory I/O requests across external memory interface 24 to the external memory.

Diagnostic and Boot Interfaces

Boot interface 28 (FIG. 1) comprises an interface to a boot programmable read-only memory (PROM) holding a system bootstrap program. To boot processing core 12, the bootstrap program is loaded into an instruction cache in processing core 12 via boot interface 28. The bootstrap program then is used by processing core 12 to start operation of the processing core, and in particular, the operating system.

In accordance with one embodiment of the present invention, and as discussed in more detail below with reference to FIG. 5, multiple processor chips 10 may be connected together via I/O links 26 of each chip 10. In accordance with this aspect of the invention, only one of the multiple chips 10 may be configured with a boot interface 28 (see FIG. 5). Thus, to boot all the processing cores 12 of the connected chips 10, the bootstrap program first is loaded into the processing core 12 of the chip 10 having boot interface 28. Once that processing core has been started, the bootstrap program is passed to the other chips 10 via I/O links 26 and DSM controllers 22. Once received by the other chips 10, the bootstrap program can be used to boot all the processing cores 12.

Diagnostic interface 30 comprises an interface for connecting a debugging apparatus or program to processor chip 10, and more specifically to processing core 12, for external examination of the processor chip and processing core. For example, a debugging apparatus can be connected to chip 10 and used to monitor the internal state of the processing core to determine whether the processing core and/or the operating system are performing properly.

Processor Chip Scalability

Figure 5:
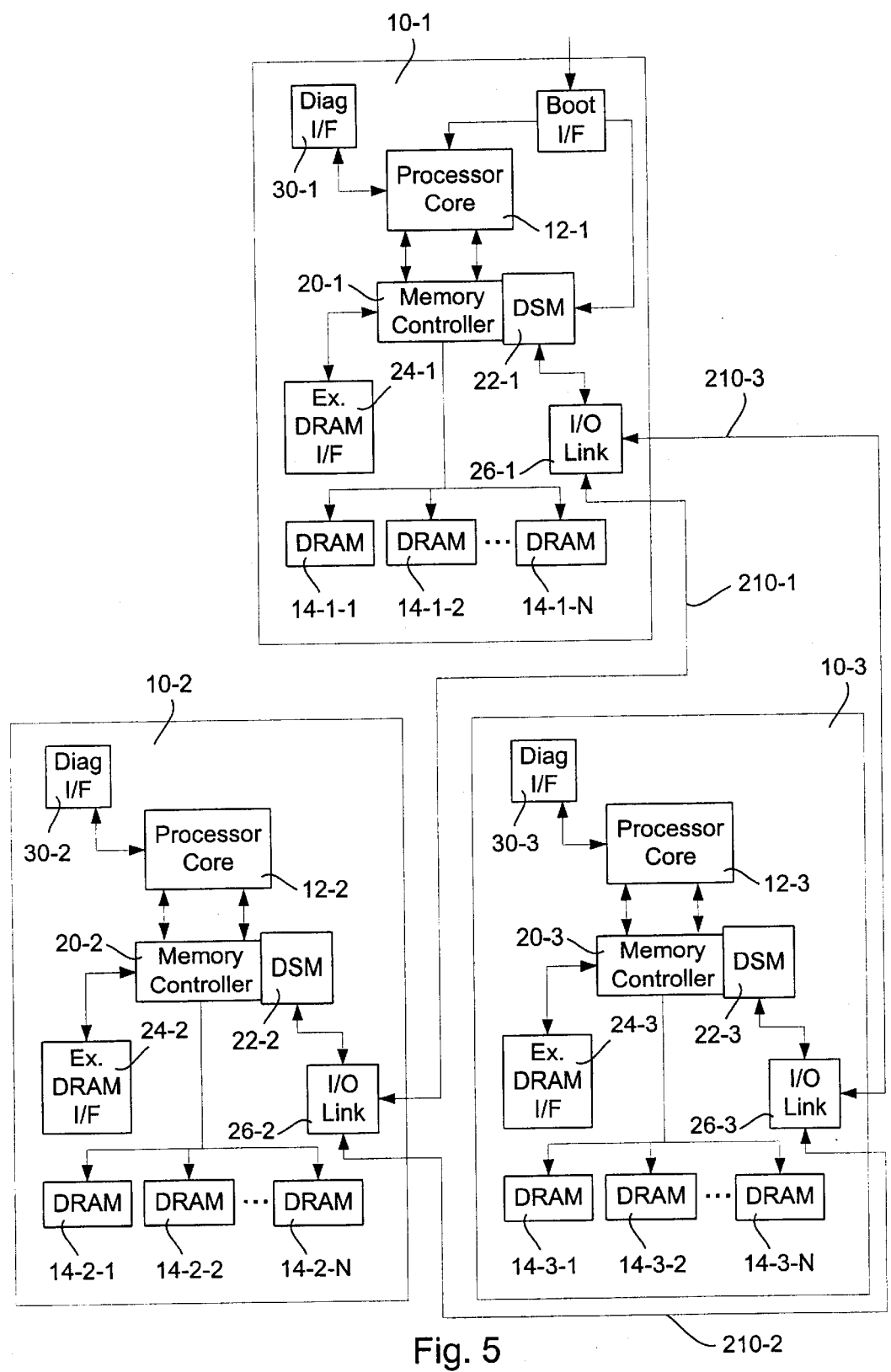
FIG. 5 is a block diagram of three of the processor chips of FIG. 1 connected in parallel.

Referring now to FIG. 5, a multi-processor chip network 200 is illustrated. In accordance with this particular illustrated embodiment, three processor chips 10-1, 10-2, and 10-3 are connected together via each processor chip's I/O link 26. As discussed above with reference to FIG. 1, I/O link 26 comprises a high-speed packet-switched I/O interface for connecting multiple processor chips and/or other I/O peripheral devices. In accordance with one embodiment of the present invention, the DSM controllers 22 in each processor chip 10 control the routing of memory requests, I/O requests and data messages from each processor chip 10 to the other processor chips 10. That is, the DSM controllers 22 generate memory and I/O requests for other DSM controllers, and receive and respond to similar requests from the other DSM controllers 22. In this manner, DSM controllers 22 maintain data consistency across the system, (i.e., multiple processors, register files and memory), as well as perform and control I/O requests to off-chip I/O devices. DSM controllers 22 include routing or switch tables which help DSM controllers 22 route the memory and I/O requests to the appropriate devices.

For example, a typical communication between processor chips 10 will now be described. In particular, in accordance with one embodiment of the present invention, processing core 12-1 on processor chip 10-1 issues a request to memory. Memory controller 20-1 on chip 10-1 receives the memory request and determines if the memory request is accessing memory 14-1 on chip 10-1, external memory connected to chip 10-1, or memory 14-2 on chip 10-2 or memory 14-3 on chip 10-3. If the memory request is destined for memory 14-2 or 14-3 on the other processor chips, DSM controller 22-1 on chip 10-1 utilizes one or more routing tables to determine the path the memory request should take to get to its destination. DSM controller 22-1 then passes the request to the appropriate destination via I/O link 26-1. For example, if the memory request is destined for memory 14-2 on chip 10-2, chip 10-2 will receive the request into its DSM controller 22-2 via I/O link 26-2 and communication line 210-1. DSM controller 22-2 then passes the request to memory controller 20-2 on chip 10-2 for memory access, and the result is passed back via DSM controller 20-2 and communicate line 210-1 to chip 10-1 via I/O links 26-2 and 26-1 respectively. Similarly, if a memory request is destined for memory 14-3 on chip 10-3, the request will either pass directly to chip 10-3 via communication line 210-3, or this request will first pass to chip 10-2 via communication line 210-1, and then onto chip 10-3 via communication line 210-2. In accordance with an alternative embodiment, the request may pass directly to chip 10-3 across a bus connection. That is, chip 10-1 may be configured to communicate with chip 10-3 directly through chip 10-2, or along a communication bus, or all the chips 10 may be connected via a communication bus. In accordance with this particular example, if a bus configuration is used, chip 10-2 will not act as the intermediate communication point between chips 10-1 and 10-3. As one skilled in the art will appreciate, the DSM controllers 22 on each chip 10-1, 10-2, and 10-3 or chips 10-1, and 10-3, depending on the communication configuration, will control the path and communication interface for the request passing from chip 10-1 to 10-3, and back.

In addition to passing on-chip memory requests between processor chips 10, DSM controllers 22 and I/O links 26 also can pass information between the multiple chips 10 relating to data messages, memory state change commands, memory synchronization commands, data propagation commands, and I/O requests to external devices. In this manner, by connecting multiple processor chips 10 together, multiple processing cores and memory can be networked together to increase the processing power of the computer. Thus, a supercomputing device can be created by networking together multiple processor chips, each having multiple processing pipelines configured therein.

Conclusion

In conclusion, the present invention provides a processor chip having a processing core and memory fabricated on the same silicon die. While a detailed description of one or more embodiments of the invention have been given above, various alternatives, modifications, and equivalents will be apparent to those skilled in the art. For example, while the embodiment of the processing core discussed above relates to a processing core having a synchronized VLIW processing pipeline, a processing core having multiple independent processing pipelines may be used without varying from the spirit of the invention. In addition, as discussed above, multiple processor chips may be combined together to create an enhanced processing core and memory subsystem.

Therefore, the above description should not be taken as limiting the scope of the invention which is defined by the appended claims.

What is claimed is:

1. A processor chip, comprising:
   a processing core;
   at least one bank of DRAM memory;
   an I/O link configured to communicate with other like processor chips or compatible I/O devices; and
   a communication and memory controller in electrical communication with said processing core, said at least one bank of DRAM memory, and said I/O link;
   an external memory interface in electrical communication with said communication and memory controller, said external memory interface configured to connect said processor chip in electrical communication with external memory;
   said communication and memory controller configured to control the exchange of data between said processor chip and said other processor chips or I/O devices, and said communication and memory controller configured to receive memory requests from said processing core and from said other processor chips via said I/O link, determine whether said memory requests are directed to said at least one bank of DRAM memory on said processor chip or said external memory, and process said memory requests with said at least one bank of DRAM memory on said processor chip or with said external memory through said external memory interface.

2. The processor chip as recited in claim 1, wherein said communication and memory controller comprises:
   a memory controller in electrical communication with said processing core and said at least one bank of DRAM memory; and
   a distributed shared memory controller in electrical communication with said memory controller and said I/O link;
   said distributed shared memory controller configured to control the exchange of data between said processor chip and said other processor chips or I/O devices;
   said memory controller configured to receive memory requests from said processing core and said distributed shared memory controller, determine whether said memory requests are directed to said at least one bank of DRAM memory on said processor chip or said external memory, and process said memory requests with said at least one bank of DRAM memory on said processor chip or with said external memory through said external memory interface.

3. The processor chip as recited in claim 1, further comprising a boot interface in communication with said processing core and configured to load a processing core instruction cache with a bootstrap program.

4. The processor chip as recited in claim 1, wherein said external memory comprises DRAM.

5. The processor chip as recited in claim 1, further comprising a diagnostic interface in communication with said processing core and configured to enable external examination of an internal state of said processing core.

6. The processor chip as recited in claim 1, wherein a processing instruction comprises N-number of P-bit instructions appended together to form a very long instruction word (VLIW), and said processing core comprises one or more processing pipelines having N-number of M-bit processing paths configured to process N-number of P-bit instructions in parallel.

7. The processor chip as recited in claim 6, wherein said one or more processing pipelines comprise an execute unit for each of said N-number of M-bit processing paths, said execute units comprising an integer processing unit, a load/store processing unit, a floating point processing unit, or any combination of one or more of said integer processing units, said load/store processing units, and said floating point processing units.

8. The processor chip as recited in claim 6, wherein M=64 and P=32.

9. A processor chip, comprising:
- a processing core;
- at least one bank of DRAM memory;
- an I/O link configured to communicate with other like processor chips or compatible I/O devices;
- a memory controller in electrical communication with said processing core and said at least one bank of memory;
- a distributed shared memory controller in electrical communication with said memory controller and said I/O link; and
- an external memory interface in electrical communication with said memory controller;
- said distributed shared memory controller configured to control the exchange of data between said processor chip and said other of said one or more processor chips or I/O devices;
- said external memory interface configured to connect said processor chip in electrical communication with external memory;
- said memory controller configured to receive memory requests from said processing core and said distributed shared memory controller, determine whether said memory requests are directed to said at least one bank of memory on said processor chip or to said external memory, and process said memory requests with said at least one bank of DRAM memory or with said external memory through said external memory interface.

10. The processing chip as recited in claim 9, wherein said memory controller and said distributed shared memory controller are configured together as a single controller unit.

11. In a computer system, a scalable computer processing architecture, comprising:
- one or more processor chips, each comprising:
  - a processing core;
  - at least one bank of memory;
  - an I/O link configured to communicate with other of said one or more processor chips or with compatible I/O devices;
  - a memory controller in electrical communication with said processing core and said at least one bank of memory;
  - a distributed shared memory controller in electrical communication with said memory controller and said I/O link; and
  - an external memory interface in electrical communication with said memory controller;
  - said distributed shared memory controller configured to control the exchange of data between said processor chip and said other of said one or more processor chips or I/O devices;
  - said external memory interface configured to connect said one or more processor chips in electrical communication with external memory;
  - said memory controller configured to receive memory requests from said processing core and said distributed shared memory controller, determine whether said memory requests are directed to said at least one bank of memory on said one or more processor chips or to said external memory, and process said memory requests with said at least one bank of memory or with said external memory through said external memory interface;
- wherein said computer processing architecture can be scaled larger by connecting together two or more of said processor chips in parallel via said I/O links of said processor chips, so as to create multiple processing core pipelines which share data therebetween.

12. The computer processing architecture as recited in claim 11, wherein the memory controller and the distributed shared memory controller on each of the processor chips are configured together as single controller unit.

13. The computer processing architecture as recited in claim 11, wherein said external memory comprises DRAM.

14. The computer processing architecture as recited in claim 11, wherein said at least one bank of memory on said one or more processor chips comprises DRAM.

15. The computer processing architecture as recited in claim 11, wherein at least one of said one or more processor chips further comprises a boot interface in communication with said processing core on said at least one of said one or more processor chips, said boot interface configured to load a processing core instruction cache with a bootstrap program.

16. The computer processing architecture as recited in claim 11, wherein at least one of said one or more processor chips further comprises a diagnostic interface in communication with said processing core on said at least one of said one or more processor chips, said diagnostic interface configured to enable external examination of an internal state of said processing core.

17. The computer processing architecture as recited in claim 11, comprising a first and a second processor chip, and wherein said processing core on said first processor chip is configured to access said at least one bank of memory on said second processor chip through the I/O links of said first and said second processor chips.

18. The computer processing architecture as recited in claim 17, wherein a memory request directed from said processing core on said first processor chip to said at least one bank of memory on said second processor chip is processed by:
- said processing core on said first processor chip sending a memory request to said memory controller on said first processor chip;
- said memory controller on said first processor chip determining that said memory request is not destined to said at least one bank of memory on said first processor chip, and passing said memory request to said distributed shared memory controller on said first processor chip;
- said distributed shared memory controller on said first processor chip passing said memory request to said distributed shared memory controller on said second processor chip via said I/O links on said first and said second processor chips;
- said distributed shared memory controller on said second processor chip passing said memory request to said memory controller on said second processor chip;
- said memory controller on said second processor chip processing said memory request with said at least one bank of memory on said second processor chip, performing a memory access function;

said memory controller on said second processor chip passing a result of said memory access function back to said distributed shared memory controller on said second processor chip;

said distributed shared memory controller on said second processor chip passing said result of said memory access function back to said distributed shared memory controller on said first processor chip via said I/O links on said first and said second processor chips;

said distributed shared memory controller on said first processor chip passing said result of said memory access function to said memory controller on said first processor chip; and said memory controller on said first processor chip communicating said result of said memory access function to said processing core on said first processor chip.

19. The computer processing architecture as recited in claim 11, wherein a processing instruction comprises N-number of P-bit sub-instructions appended together to form a very long instruction word (VLIW), and said processing core of at least one of said one or more processor chips comprises one or more processing pipelines having N-number of M-bit processing paths configured to process N-number of P-bit sub-instructions in parallel.

20. The computer processing architecture as recited in claim 19, wherein M=64 and P=32.

21. The computer processing architecture as recited in claim 19, wherein said processing pipeline comprises an execute unit for each of said N-number of M-bit processing paths, said execute units comprising an integer processing unit, a load/store processing unit, a floating point processing unit, or any combination of one or more of said integer processing units, said load/store processing units, and said floating point processing units.

22. The computer processing architecture as recited in claim 21, wherein one or more of said execute units comprise a floating point processing unit.

23. A processor chip, comprising:
   a processing core;
   at least one bank of DRAM memory;
   an I/O link configured to communicate with other like processor chips or compatible I/O devices;
   a memory controller in electrical communication with said processing core and said at least one bank of memory; and
   a distributed shared memory controller in electrical communication with said memory controller and said I/O link, said distributed shared memory controller comprising a first communication engine and a second communication engine;
   said first communication engine configured to receive I/O requests or data messages from said processing core destined for one or more processor chips or I/O devices and communicate the I/O requests or data messages to the one or more processor chips or I/O devices;
   said second communication engine configured to receive I/O requests from one or more processor chips or I/O devices and communicate the I/O requests with the processing core or the memory controller;
   said memory controller configured to receive memory requests from said processing core and said distributed shared memory controller, and process said memory requests with said at least one bank of DRAM memory.

24. The processor chip as recited in claim 23, further comprising external memory interface in electrical communication with said memory controller, said external memory interface configured to connect said processor chip in electrical communication with external memory; and
   said memory controller configured to receive memory requests from said processing core and said distributed shared memory controller, determine whether said memory requests are directed to said at least one bank of memory on said processor chip or to said external memory, and process said memory requests with said at least one bank of memory or with said external memory through said external memory interface.

25. The processor chip as recited in claim 24, wherein said external memory comprises DRAM.

26. The processor chip as recited in claim 23, further comprising a boot interface in communication with said processing core and configured to load a processing core instruction cache with a bootstrap program.

27. The processor chip as recited in claim 23, further comprising a diagnostic interface in communication with said processing core and configured to enable external examination of an internal state of said processing core.

28. The processor chip as recited in claim 23, wherein a processing instruction comprises N-number of P-bit instructions appended together to form a very long instruction word (VLIW), and said processing core comprises one or more processing pipelines having N-number of M-bit processing paths configured to process N-number of P-bit instructions in parallel.

29. The processor chip as recited in claim 28, wherein said one or more processing pipelines comprise an execute unit for each of said N-number of M-bit processing paths, said execute units comprising an integer processing unit, a load/store processing unit, a floating point processing unit, or any combination of one or more of said integer processing units, said load/store processing units, and said floating point processing units.

30. The processor chip as recited in claim 28, wherein M=64 and P=32.

31. In a computer system, a scalable computer processing architecture, comprising:
   a first processor chip and a second processor chip, each comprising:
      a processing core;
      at least one bank of memory;
      an I/O link configured to communicate with other of said one or more processor chips or with compatible I/O devices;
      a memory controller in electrical communication with said processing core and said at least one bank of memory; and
      a distributed shared memory controller in electrical communication with said memory controller and said I/O link;
   wherein a memory request directed from said processing core on said first processor chip to said at least one bank of memory on said second processor chip is processed by:
      said processing core on said first processor chip sending a memory request to said memory controller on said first processor chip;
      said memory controller on said first processor chip determining that said memory request is not destined to said at least one bank of memory on said first processor chip, and passing said memory request to said distributed shared memory controller on said first processor chip;
      said distributed shared memory controller on said first processor chip passing said memory request to said distributed shared memory controller on said second processor chip via said I/O links on said first and said second processor chips;

said distributed shared memory controller on said second processor chip passing said memory request to said memory controller on said second processor chip;

said memory controller on said second processor chip processing said memory request with said at least one bank of memory on said second processor chip, performing a memory access function;

said memory controller on said second processor chip passing a result of said memory access function back to said distributed shared memory controller on said second processor chip;

said distributed shared memory controller on said second processor chip passing said result of said memory access function back to said distributed shared memory controller on said first processor chip via said I/O links on said first and said second processor chips;

said distributed shared memory controller on said first processor chip passing said result of said memory access function to said memory controller on said first processor chip; and said memory controller on said first processor chip communicating said result of said memory access function to said processing core on said first processor chip.

32. The computer processing architecture as recited in claim 31, wherein the memory controller and the distributed shared memory controller on each of the first and the second processor chips are configured together as single controller unit.

33. The computer processing architecture as recited in claim 31, wherein a processing instruction comprises N-number of P-bit sub-instructions appended together to form a very long instruction word (VLIW), and said processing core of at least one of said one or more processor chips comprises one or more processing pipelines having N-number of M-bit processing paths configured to process N-number of P-bit sub-instructions in parallel.

34. The computer processing architecture as recited in claim 33, wherein said processing pipeline comprises an execute unit for each of said N-number of M-bit processing paths, said execute units comprising an integer processing unit, a load/store processing unit, a floating point processing unit, or any combination of one or more of said integer processing units, said load/store processing units, and said floating point processing units.

35. The computer processing architecture as recited in claim 34, wherein one or more of said execute units comprise a floating point processing unit.

36. The computer processing architecture as recited in claim 33, wherein M=64 and P=32.

37. The processor chip as recited in claim 31, wherein the memory controller and the distributed shared memory controller are configured together as single controller unit.

* * * * *